United States Patent
Endou et al.

(10) Patent No.: US 10,377,952 B2
(45) Date of Patent: Aug. 13, 2019

(54) METHOD FOR INHIBITING OCCURRENCE OF PYROLYSIS DEPOSIT IN PYROLYSIS GASIFICATION SYSTEM, AND PYROLYSIS GASIFICATION SYSTEM

(71) Applicant: MITSUBISHI HEAVY INDUSTRIES ENVIRONMENTAL & CHEMICAL ENGINEERING CO., LTD., Yokohama-shi, Kanagawa (JP)

(72) Inventors: Yuuki Endou, Yokohama (JP); Takehiro Kitta, Tokyo (JP); Kazuaki Kakurata, Yokohama (JP); Junichiro Abe, Yokohama (JP)

(73) Assignee: MITSUBISHI HEAVY INDUSTRIES ENVIRONMENTAL & CHEMICAL ENGINEERING CO., LTD., Yokohama-Shi, Kanagawa (JP)

( * ) Notice: Subject to any disclaimer, the term of this patent is extended or adjusted under 35 U.S.C. 154(b) by 793 days.

(21) Appl. No.: 14/896,853

(22) PCT Filed: Jul. 11, 2013

(86) PCT No.: PCT/JP2013/068984
§ 371 (c)(1),
(2) Date: Dec. 8, 2015

(87) PCT Pub. No.: WO2015/004773
PCT Pub. Date: Jan. 15, 2015

(65) Prior Publication Data
US 2016/0168471 A1    Jun. 16, 2016

(51) Int. Cl.
*C10B 27/06* (2006.01)
*F23G 7/10* (2006.01)
(Continued)

(52) U.S. Cl.
CPC .............. *C10B 27/06* (2013.01); *C10B 47/28* (2013.01); *C10B 53/02* (2013.01); *F23G 5/0276* (2013.01);
(Continued)

(58) Field of Classification Search
CPC ......... C10B 27/06; C10B 47/28; C10B 47/30; C10B 53/02; F23G 2201/303; F23G 2207/30; F23G 5/0276; F23G 7/10
See application file for complete search history.

(56) References Cited

U.S. PATENT DOCUMENTS

| 4,848,249 A | 7/1989 | LePori et al. |
| 4,878,440 A * | 11/1989 | Tratz ................. C10B 47/30 110/233 |
| 2012/0118106 A1 | 5/2012 | Meng |

FOREIGN PATENT DOCUMENTS

| CN | 1223715 A | 7/1999 |
| EP | 1746145 A2 | 1/2007 |

(Continued)

OTHER PUBLICATIONS

JPO Machine Translation of JP09-196337A, retrieved Aug. 1, 2018 (Year: 2018).*

(Continued)

*Primary Examiner* — Renee Robinson
*Assistant Examiner* — Derek N Mueller
(74) *Attorney, Agent, or Firm* — Manabu Kanesaka; Benjamin Hauptman; Kenneth Berner

(57) ABSTRACT

This method for inhibiting the occurrence of a pyrolysis deposit in a pyrolysis gasification system includes: gasifying biomass (S2) through pyrolysis in a pyrolysis gasification furnace (5); separating, in a solid-gas separation unit (7), a pyrolysis gas (G1) and a carbide (C) continuously formed through pyrolysis of the biomass (S2); feeding an oxygen-
(Continued)

containing gas (G3) to the separated pyrolysis gas (G1); and introducing the pyrolysis gas (G1) together with the oxygen-containing gas (G3) to a combustion furnace (6) through a pipe (9) which constitutes a pyrolysis gas line (8).

12 Claims, 4 Drawing Sheets

(51) Int. Cl.
*C10B 53/02* (2006.01)
*F23L 7/00* (2006.01)
*F23G 5/027* (2006.01)
*C10B 47/28* (2006.01)
*C10B 47/30* (2006.01)

(52) U.S. Cl.
CPC ................ *F23G 7/10* (2013.01); *F23L 7/007* (2013.01); *C10B 47/30* (2013.01); *F23G 2201/303* (2013.01); *F23G 2207/30* (2013.01); *Y02E 20/344* (2013.01); *Y02E 50/14* (2013.01); *Y02P 20/145* (2015.11)

(56) References Cited

FOREIGN PATENT DOCUMENTS

| JP | H08-170817 A | 7/1996 |
|----|--------------|--------|
| JP | H09-079542 A | 3/1997 |
| JP | H09-196337 A | 7/1997 |
| JP | H09-236231 A | 9/1997 |
| JP | 2001-263625 A | 9/2001 |
| JP | 2001-334242 A | 12/2001 |
| JP | 2005-247992 A | 9/2005 |
| JP | 2011-068859 A | 4/2011 |
| JP | 2012-031335 A | 2/2012 |
| JP | 2013-155302 A | 8/2013 |

OTHER PUBLICATIONS

Japan Patent Office, "Notice of Allowance for Japanese Patent Application No. 2012-017249," dated Aug. 30, 2016.
PCT/ISA/210, "International Search Report for International Application No. PCT/JP2013/068984," dated Oct. 15, 2013.
PCT/ISA/237, "Written Opinion of the International Searching Authority for International Application No. PCT/JP2013/068984," dated Oct. 15, 2013.
Japan Patent Office, "Notice of Reasons for Rejection for Japanese Patent Application No. 2012-017249," dated Jan. 19, 2016.
Europe Patent Office, "Search Report for European Patent Application No. 13889191.6," dated Apr. 20, 2016.
China Patent Office, "Office Action for Chinese Patent Application No. 201380077125.8," dated Oct. 19, 2016.

* cited by examiner

METHOD FOR INHIBITING OCCURRENCE OF PYROLYSIS DEPOSIT IN PYROLYSIS GASIFICATION SYSTEM, AND PYROLYSIS GASIFICATION SYSTEM

RELATED APPLICATIONS

The present application is National Phase of International Application No. PCT/JP2013/068984 filed Jul. 11, 2013 the disclosure of which is hereby incorporated by reference herein in its entirety.

TECHNICAL FIELD

The present invention relates to a method for inhibiting the occurrence of a pyrolysis deposit in a pyrolysis gasification system that gasifies a biomass, such as a sewage sludge or a woody biomass, and a pyrolysis gasification system therefor.

BACKGROUND ART

The gasification of a biomass, such as a sewage sludge or a woody biomass, in a pyrolysis gasification system and conversion of the biomass, which has been conventionally treated as waste, into resources for effective use has been in demand. For example, manufacturing a carbide by gasifying and carbonizing a sewage sludge in a pyrolysis gasification system, and using the carbide as carbonized fuel for power generation has been proposed and put to practical use.

Examples of carbonization systems that manufacture carbonized fuel from this sewage sludge include a system configured to include a drying process facility, a pyrolysis gasification system (a pyrolysis gasification facility), and an exhaust gas treatment facility (refer to Patent Document 1, example). The drying process facility subjects the sewage sludge (dewatered sludge) to a drying process. The pyrolysis gasification system gasifies the dried sludge through heating and pyrolysis in a low oxygen atmosphere using a pyrolysis gasification furnace to form a carbide, and further subjects the pyrolysis gas to a clean combustion and combustion deodorizing process at a high temperature using a combustion furnace. The exhaust gas treatment facility collects waste heat from a combustion exhaust gas, and subjects the exhaust gas to, for example, desulfurization, demineralization, cooling, and dehumidification.

Further, in this type of carbonization system, the waste heat collected by the exhaust gas treatment facility and the waste heat from the combustion furnace of the pyrolysis gasification system are fed to the drying process facility and the pyrolysis gasification furnace of the pyrolysis gasification system, and utilized as a heat source for drying and carbonizing the sewage sludge. Furthermore, the exhaust gas discharged from the drying process facility is fed to the combustion furnace of the pyrolysis gasification system, and subjected to the clean combustion and combustion deodorizing process at a high temperature along with the pyrolysis gas.

Further, the pyrolysis gasification system is configured to pyrolyze the sewage sludge (the biomass) at a temperature of 300 to 600° C. in the absence of oxygen by means of the pyrolysis gasification furnace, separate the carbide and the pyrolysis gas by means of a solid-gas separation unit arranged side by side with the pyrolysis gasification furnace, feed the separated pyrolysis gas to the combustion furnace through a pipe which constitutes a pyrolysis gas line, and subject the pyrolysis gas to combustion processing.

Meanwhile, in the pyrolysis gasification system thus configured, pyrolysis components such as tar in the pyrolysis gas fed from the pyrolysis gasification furnace to the combustion furnace are polymerized and gas-phase precipitated (condensed) by polycondensation, and adhere to and accumulate on, for example, an inner wall of the pipe which constitutes the pyrolysis gas line, and an impeller of a fan arranged midway on the pipe, as a pyrolysis deposit. It should be noted that the amount of pyrolysis deposit that occurs can be expressed by a linear function of a pyrolysis component concentration of the pyrolysis gas and a reaction time. Then, when the amount of the adhered and accumulated pyrolysis deposit increases as a result of continuous operation, for example, blockage of the pipe, and an increase in fan output and vibration in association with deterioration of impeller balance occur. For this reason, the pyrolysis gasification system conventionally needs to be periodically stopped to clean the interior of the pipe that constitutes the pyrolysis gas line and remove the pyrolysis deposit.

In response, Patent Document 1 describes a method for removing a pyrolysis deposit that includes stopping the operation of the pyrolysis gasification system when fan output exceeds a reference value or at a stage when the pyrolysis gasification system has been operated a certain period of time, and burning and removing an adhered and accumulated pyrolysis deposit by circulating a mixed gas of an inert gas and oxygen in the pipe that constitutes the pyrolysis gas line provided between the pyrolysis gasification furnace and the combustion furnace.

In this method for removing a pyrolysis deposit thus performed after stopping the operation of the pyrolysis gasification system (the method for removing a pyrolysis deposit on the basis of offline decoking), a mixed gas having an oxygen concentration of at least 5 volume % and no greater than 13 volume % is circulated in the pyrolysis gas line at a gas temperature of at least 500° C. This makes it possible to oxidize the pyrolysis deposit by partial combustion, promote a solid-to-gas phase change, and efficiently burn and remove the pyrolysis deposit. Further, in this method for removing a pyrolysis deposit, the oxygen concentration of the mixed gas fed to the pyrolysis gas line of the pyrolysis gasification system thus stopped is 13 volume % or less, thereby preventing runaway combustion of the pyrolysis deposit and the occurrence of explosion by carbon monoxide, hydrogen, methane, or the like that forms as a result of combustion of the pyrolysis deposit.

CITATION LIST

Patent Literature

Patent Document 1: Japanese Unexamined Patent Application Publication No. 2011-68859A

SUMMARY OF INVENTION

Technical Problem

The above-described method for removing a pyrolysis deposit of Patent Document 1 is capable of efficiently burning and removing a pyrolysis deposit that is adhered during continuous operation of facilities at a low oxygen concentration of at least 5 volume % and no greater than 13 volume %, in a temperature range of 500 to 650° C., allowing the cleaning frequency of the facilities to significantly decrease compared to the related art. However, the method still requires the facility to be stopped during pyrolysis deposit removal.

In a case of a carbonization system for, in particular, a sewage sludge, the occurrence of a sewage sludge cannot be limited even during the period in which the facilities are stopped, and thus problems which need to be solved from maintenance and management point of view, such as the need of another facility that stores the sludge that occurs during pyrolysis deposit removal, arise. As a result, a technique capable of removing a pyrolysis deposit during continuous operation without stopping facilities, and a technique capable of inhibiting the occurrence of a pyrolysis deposit itself have been in high demand.

An object of the present invention is to provide a method for inhibiting the occurrence of a pyrolysis deposit in a pyrolysis gasification system capable of inhibiting the occurrence of a pyrolysis deposit during continuous operation without stopping facilities, and a pyrolysis gasification system therefor.

Solution to Problem

According to a first aspect of the present invention, a method for inhibiting the occurrence of a pyrolysis deposit in a pyrolysis gasification system includes: gasifying biomass through pyrolysis in a pyrolysis gasification furnace; separating, in a solid-gas separation unit, a pyrolysis gas and a carbide continuously formed through pyrolysis of the biomass; feeding an oxygen-containing gas to the separated pyrolysis gas; and introducing the pyrolysis gas together with the oxygen-containing gas to a combustion furnace through a pipe which constitutes a pyrolysis gas line.

According to a second aspect of the present invention, a pyrolysis gasification system includes: a pyrolysis gasification furnace that gasifies biomass through pyrolysis; a solid-gas separation unit that separates a pyrolysis gas and a carbide continuously formed through pyrolysis of the biomass; oxygen-containing gas feeding means for feeding an oxygen-containing gas to the separated pyrolysis gas; and a combustion furnace that allows the pyrolysis gas together with the oxygen-containing gas to be introduced therein through a pipe which constitutes a pyrolysis gas line, and subjects the pyrolysis gas to a combustion process.

In the first aspect and the second aspect of the present invention, when the oxygen-containing gas is fed to the pyrolysis gas separated from the carbide in the solid-gas separation unit while the pyrolysis gasification system is operating, it is possible to form a high-temperature flame of about 1000 to 1400° C. by the oxygen in the oxygen-containing gas, and pyrolyze (cause an endothermic reaction with) pyrolysis components, such as tar, in the pyrolysis gas by this flame. Accordingly, the pyrolysis component concentration in the pyrolysis gas can be decreased, making t possible to inhibit the occurrence of a pyrolysis deposit in the pyrolysis gas line for introducing this pyrolysis gas to the combustion furnace.

Further, according to a third aspect of the present invention, in the method for inhibiting the occurrence of a pyrolysis deposit in a pyrolysis gasification system described above, the oxygen-containing gas may be a gas having an oxygen concentration of at least 15 volume %.

Here, for example, a dried sewage sludge and a dried woody biomass such as wood chips contain moisture ($H_2O$) of about 15 volume % and about 20 volume %, respectively. Thus, when a biomass such as the sewage sludge or the woody biomass is gasified in a pyrolysis gasification furnace, a pyrolysis gas that contains moisture of at least 30 volume % is formed.

In the third aspect of the present invention, the oxygen-containing gas is fed to the pyrolysis gas while the pyrolysis gasification system is operating. As a result, the oxygen-containing gas is fed to a pyrolysis gas that is obtained by gasifying a biomass such as described above and contains a large amount of moisture. Accordingly, a limiting oxygen concentration that causes explosion due to the moisture in the pyrolysis gas increases, making it possible to suitably form a flame and pyrolyze the pyrolysis components in the pyrolysis gas without the occurrence of runaway combustion or explosion, even if an oxygen-containing gas having a high oxygen concentration of at least 15 volume % is fed.

Furthermore, according to a fourth aspect of the present invention, in the method for inhibiting the occurrence of a pyrolysis deposit in a pyrolysis gasification system, the oxygen-containing gas may be fed to the pyrolysis gas so that a mixed gas obtained by mixing the oxygen-containing gas with the pyrolysis gas has a temperature of from 500 to 650° C.

In the fourth aspect of the present invention, the oxygen-containing gas is fed to the pyrolysis gas so that the mixed gas obtained by mixing the oxygen-containing gas with the pyrolysis gas has a temperature of from 500 to 650° C. while stainless-steel components, such as a pipe and a fan that constitute the pyrolysis gas line, have a heat-resistance temperature of from about 700 to 800° C., for example. As a result, it is possible to inhibit the occurrence of a pyrolysis deposit in the pyrolysis gas line while ensuring that the heat-resistance temperature of the components of the pyrolysis gas line is not exceeded.

Further, according to a fifth aspect of the present invention, in the method for inhibiting the occurrence of a pyrolysis deposit in a pyrolysis gasification system, the oxygen-containing gas may be fed to the pyrolysis gas so that a ratio of an actual feed rate of the oxygen-containing gas to a logical feed rate of the oxygen-containing gas required for complete combustion of the pyrolysis gas is 0.1 or less.

In the fifth aspect of the present invention, even if the oxygen-containing gas is fed to the pyrolysis gas so that the ratio (synonymous with a so-called air ratio) of the actual feed rate of the oxygen-containing gas to the logical feed rate of the oxygen-containing gas required for complete combustion of the pyrolysis gas is a significantly low 0.1 or less, it is possible to form a flame and reliably decrease the pyrolysis component concentration of the pyrolysis gas.

Furthermore, according to a sixth aspect of the present invention, in the method for inhibiting the occurrence of a pyrolysis deposit in a pyrolysis gasification system described above, the oxygen-containing gas may be fed to the pyrolysis gas in the solid-gas separation unit.

In the first aspect of the present invention, the oxygen-containing gas is fed to the pyrolysis gas and a high-temperature flame of about 1000 to 1400° C. is formed to pyrolyze the pyrolysis components in the pyrolysis gas. As a result, when the oxygen-containing gas is fed to the pipe that constitutes the pyrolysis gas line and a flame is formed in this pipe, burnout or erosion may occur in the pipe. According to the sixth aspect of the present invention, the oxygen-containing gas is fed in the solid-gas separation unit and the pyrolysis components are then pyrolyzed, making it possible to reliably prevent the occurrence of damage in the pyrolysis gas line.

Further, according to a seventh aspect of the present invention, in the method for inhibiting the occurrence of a pyrolysis deposit in a pyrolysis gasification system described above, the oxygen-containing gases having different oxygen concentrations may be prepared, and an oxygen-containing gas having a low oxygen concentration and an oxygen-containing gas having a high oxygen concentration of the oxygen-containing gases may be selectively fed to the pyrolysis gas.

Here, pyrolysis of the pyrolysis components in the pyrolysis gas by a flame formed by feeding the oxygen-containing gas to the pyrolysis gas is pyrolysis based on partial combustion, and decomposing all pyrolysis components in the pyrolysis gas is difficult. The possibility therefore exists that, when the pyrolysis gas circulates through the pyrolysis gas line toward the combustion furnace and decreases in temperature, the remaining pyrolysis components will precipitate, adhere to, and accumulate on the pipe or the like.

In response, when the oxygen-containing gas having a high oxygen concentration is suitably and selectively fed to the pyrolysis gas periodically or as required, for example, it is possible to feed the remaining oxygen not consumed in the formation of the flame to a downstream side of the pyrolysis gas line, and decompose and remove a pyrolysis deposit adhered to and accumulated on the downstream side of the pyrolysis gas line upon reaction with the remaining oxygen. That is, when the oxygen-containing gas having a high oxygen concentration is suitably and selectively fed to the pyrolysis gas, operational advantages similar to those of offline decoking are achieved by the oxygen in this oxygen-containing gas, making it possible to remove the pyrolysis deposit adhered to and accumulated on the pyrolysis gas line during continuous operation without stopping the facilities.

Advantageous Effects of Invention

In the method for inhibiting the occurrence of a pyrolysis deposit in a pyrolysis gasification system and the pyrolysis gasification system described above, when the oxygen-containing gas is fed to the pyrolysis gas separated from the carbide in the solid-gas separation unit while the pyrolysis gasification system is operating, it is possible to produce a high-temperature flame by the oxygen in the oxygen-containing gas, and burn and decompose pyrolysis components, such as tar, in the pyrolysis gas by this flame. Accordingly, it is possible to inhibit the occurrence of a pyrolysis deposit in a pyrolysis gas line for introducing the pyrolysis gas to the combustion furnace.

Thus, according to the method for inhibiting the occurrence of a pyrolysis deposit in a pyrolysis gasification system and the pyrolysis gasification system described above, it is possible to inhibit the occurrence of a pyrolysis deposit itself during continuous operation without stopping facilities. Then, because it is thus possible to inhibit the occurrence of a pyrolysis deposit, the occurrence of, for example, blockage of the pipe, and an increase in fan output and vibration in association with deterioration in impeller balance can be prevented, making it possible to significantly decrease maintenance frequency and operate the pyrolysis gasification system with high efficiency.

DESCRIPTION OF EMBODIMENTS

Figure 1:
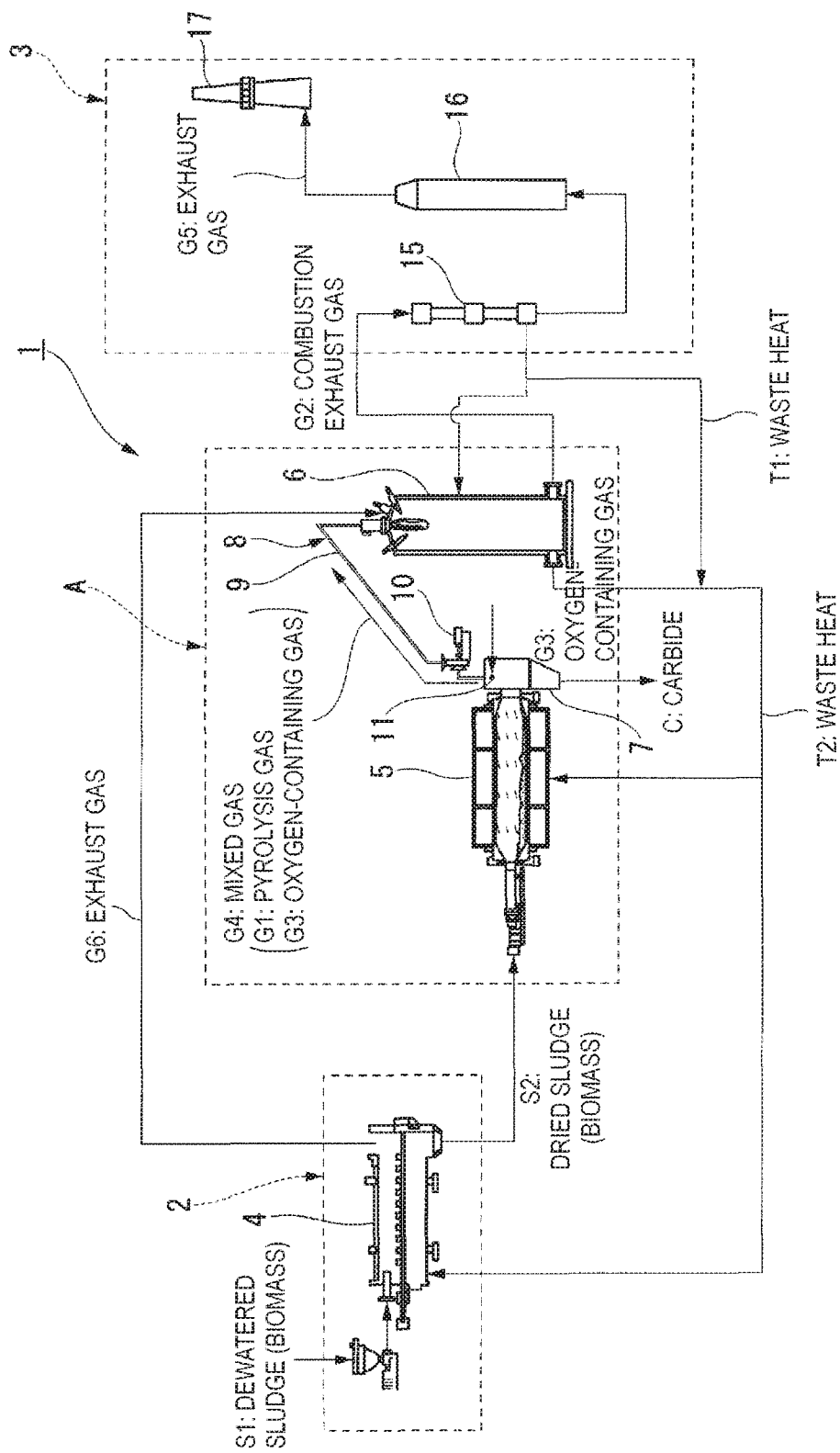
FIG. 1 is a diagram illustrating a carbonization system (pyrolysis gasification system) according to an embodiment of the present invention.

The following describes a method for inhibiting the occurrence of a pyrolysis deposit in a pyrolysis gasification system and a pyrolysis gasification system according to an embodiment of the present invention, with reference to FIG. 1 and FIGS. 2A to 2C. Here, in the present embodiment, the pyrolysis gasification system according to the present invention is described as a pyrolysis gasification facility of a carbonization system that manufactures carbonized fuel (carbide) for power generation from a sewage sludge. It should be noted that the present invention is of course not limited to a pyrolysis gasification system for gasifying a sewage sludge, and is applicable to various pyrolysis gasification systems, such as a pyrolysis gasification system for gasifying other biomass such as a woody biomass.

A carbonization system 1 of the present embodiment is configured to include a drying process facility 2 that subjects a sewage sludge (a dewatered sludge, a biomass) S1 to a drying process, a pyrolysis gasification system (a pyrolysis gasification facility) A that gasifies the dried sludge (the biomass) S2 after the drying process, and an exhaust gas treatment facility 3 for collecting waste heat from a combustion exhaust gas G2 of a pyrolysis gas G1 and treating this combustion exhaust gas G2.

The drying process facility 2 is configured to include a direct drying type dryer 4, such as a hot air dryer with an agitator, that dries the sewage sludge S1. In this drying process facility 2, the sewage sludge S1 is dried to a moisture content of about 15%, for example. The woody biomass S1 of wood chips or the like is dried to a moisture content of about 20%. That is, even if the sewage sludge is dried in the drying process facility 2, the processed dried sludge (the biomass) S2 contains moisture to a certain extent.

Next, the pyrolysis gasification system A of the present embodiment is configured to include a pyrolysis gasification furnace 5, such as an indirect heating type rotary kiln, that gasifies the dried sludge S2 after the drying process in the drying process facility 2 through heating and pyrolysis, and forms a carbide C, and a combustion furnace 6 that subjects the pyrolysis gas (PG) G1 formed in the pyrolysis gasification furnace 5 to a clean combustion and combustion deodorizing treatment at a high temperature.

This pyrolysis gasification system A is configured to further include a solid-gas separation unit 7 that is integrally arranged side by side with the pyrolysis gasification furnace 5 and separates the pyrolysis gas G1 and the carbide C, and a pyrolysis gas line 8 for introducing the pyrolysis gas G1 from the solid-gas separation unit 7 to the combustion furnace 6. Further, the pyrolysis gas line 8 is configured to include a pipe 9 having one end connected to an upper end portion side of the solid-gas separation unit 7 and having the other end connected to an inlet port (burner unit) on an upper end portion side of the combustion furnace 6, and a fan 10 arranged midway on the pipe 9. It should be noted that the fan 10 is provided for pressure adjustment to prevent plant leakage air, which readily occurs when a low-calorie biomass S2, such as a sewage sludge, is gasified.

Furthermore, in the pyrolysis gasification system A of the present embodiment, oxygen-containing gas feeding means 11, such as an oxygen-containing gas supply nozzle, is connected to the upper end portion side of the solid-gas separation unit 7. With this oxygen-containing gas feeding means 11, the pyrolysis gasification system A is configured to feed an oxygen-containing gas (modifier) G3 to the pyrolysis gas G1 after separation in the solid-gas separation unit 7. Accordingly, a mixed gas G4 that is a mixture of the oxygen-containing gas G3 and the pyrolysis gas G1 is circulated from the solid-gas separation unit 7 through the pyrolysis gas line 8, and introduced to the combustion furnace 6.

Next, the exhaust gas treatment facility 3 is configured to include a heat exchanger 15 for collecting the waste heat from the combustion exhaust gas G2 discharged from the combustion furnace 6, an exhaust gas process column 16 that, for example, desulfurizes, demineralizes, cools, and dehumidifies the exhaust gas G2, and further removes soot using a wet-type electric dust collection device, as necessary, and a chimney 17 that discharges a treated exhaust gas G5 outside.

Further, the carbonization system 1 of the present embodiment is configured so that a waste heat T1 collected in the exhaust gas treatment facility 3 and a waste heat T2 from the combustion furnace 6 of the pyrolysis gasification system A can be fed to the dryer 4 of the drying process facility 2 and the pyrolysis gasification furnace 5 of the pyrolysis gasification system A, and utilized as a heat source for drying and carbonizing the sewage sludges S1, S2. Furthermore, the carbonization system 1 is configured so that an exhaust gas G6 to be discharged from the drying process facility 2 can be fed to the combustion furnace 6 of the pyrolysis gasification system A, and subjected to a clean combustion and combustion deodorizing process at a high temperature along with the pyrolysis gas G1.

Next, a method for inhibiting the occurrence of a pyrolysis deposit in the pyrolysis gasification system A of the carbonization system 1 of the present embodiment made of the above-described configuration as well as the operational advantages of the method for inhibiting the occurrence of a pyrolysis deposit and the pyrolysis gasification system A of the present embodiment will be described.

First, during the operation of the pyrolysis gasification system A of the present embodiment, the sewage sludge S2 is gasified through pyrolysis in the pyrolysis gasification furnace 5. The pyrolysis gas G1 and the carbide C continuously formed through this pyrolysis are separated in the solid-gas separation unit 7. The pyrolysis gas G1 separated in the solid-gas separation unit 7 is introduced to the combustion furnace 6 through the pipe 9 which constitutes the pyrolysis gas line 8.

Then, according to the method for inhibiting the occurrence of a pyrolysis deposit in the pyrolysis gasification system A of the present embodiment, the oxygen-containing gas G3 is fed to the pyrolysis gas G1 after separation in the solid-gas separation unit 7 by the oxygen-containing gas feeding means 11, and the mixed gas G4 obtained by mixing the oxygen-containing gas G3 with the pyrolysis gas G1 is introduced to the combustion furnace 6 through the pipe 9 that constitutes the pyrolysis gas line 8, while the pyrolysis gasification system A is operating, as described above.

At this time, according to the present embodiment, a gas having an oxygen concentration of at least 15 volume % is used as the oxygen-containing gas G3. Then, when the oxygen-containing gas G3 is fed to the pyrolysis gas G1 in the solid-gas separation unit 7 while the pyrolysis gasification system A is operating, a high-temperature flame of about 1000 to 1400° C. is formed by the oxygen in this oxygen-containing gas G3, and the pyrolysis components, such as tar, in the pyrolysis gas G1 are pyrolyzed (subjected to an endothermic reaction) by this flame. Accordingly, the pyrolysis component concentration of the pyrolysis gas G1 decreases, and the pyrolysis gas G1 (the mixed gas G4) having a low pyrolysis component concentration is circulated from the solid-gas separation unit 7 through the combustion furnace 6 and introduced to the pyrolysis gas line 8. Accordingly, the occurrence of a pyrolysis deposit in the pyrolysis gas line 8 is inhibited.

Further, in response to the burnout and erosion that may occur in the pipe 9 when the pyrolysis components in the pyrolysis gas G1 are decomposed by feeding the oxygen-containing gas G3 to the pipe 9 that constitutes the pyrolysis gas line 8 and forming the flame in this pipe 9, for example, the pyrolysis components in the pyrolysis gas G1 are pyrolyzed by feeding the oxygen-containing gas G3 to the pyrolysis gas G1 in the solid-gas separation unit 7 and forming a flame in the solid-gas separation unit 7, which has superior heat resistance, thereby eliminating the occurrence of damage to the pyrolysis gas line 8.

Furthermore, according to the present embodiment, the oxygen-containing gas G3 is fed to the line during operation. Then, at this time, because the dried sludge (the biomass) S2 after the drying process in the drying process facility 2 contains moisture, the pyrolysis gas G1 that contains moisture of at least 30 volume % is formed when this dried sludge S2 is gasified in the pyrolysis gasification furnace 5, and the oxygen-containing gas G3 is fed to this pyrolysis gas G1 that contains such a large amount of moisture. Accordingly, the moisture in the pyrolysis gas G1 makes it possible to increase the limiting oxygen concentration that causes explosion, eliminating the occurrence of runaway combustion or explosion even if the oxygen-containing gas G3 having a high oxygen concentration of at least 15 volume % is fed as in the present embodiment.

Further, according to the present embodiment, the oxygen concentration and the feed rate of the oxygen-containing gas G3 are adjusted so that the mixed gas G4 (the pyrolysis gas G1) obtained by mixing the oxygen-containing gas G3 with the pyrolysis gas G1 has a temperature of from 500 to 650° C. For example, the heat-resistance temperature of the stainless-steel components, such as the pipe 9 and the fan 10, of the pyrolysis gas line 8 is from about 700 to 800° C. Thus, the oxygen-containing gas G3 is fed to the pyrolysis gas G1 so that the mixed gas G4 obtained by mixing the oxygen-containing gas G3 with the pyrolysis gas G1 has a temperature of from 500 to 650° C., ensuring that the heat-resistance temperature of the components that constitute the pyrolysis gas line 8 is not exceeded.

Then, for example, when the oxygen-containing gas G3 having a high oxygen concentration of at least 15 volume % is fed to the pyrolysis gas G1 formed upon gasification of the sewage sludge S2 as in the present embodiment, the oxygen-containing gas G3 is fed to the pyrolysis gas G1 so that the ratio (air ratio) of the actual feed rate of the oxygen-containing gas G3 to the logical feed rate of the oxygen-containing gas G3 required for complete combustion of the pyrolysis gas G1 is 0.1 or less, and thus a flame is reliably formed and the temperature of the mixed gas G4 reliably becomes 500 to 650° C.

In other words, in the method for inhibiting the occurrence of a pyrolysis deposit in the pyrolysis gasification system A and the pyrolysis gasification system A of the present embodiment, a small amount of the oxygen-containing gas G3 is simply fed to the pyrolysis gas G1 so that an extremely low air ratio of 0.1 or less is achieved while the pyrolysis gasification system A, is operating, thereby decreasing the pyrolysis component concentration of the pyrolysis gas G1 and making it possible to prevent component damage and inhibit the occurrence of a pyrolysis deposit in the pyrolysis gas line 8.

The following describes the test results obtained after feeding the oxygen-containing gas G3 from the solid-gas separation unit 7 of the pyrolysis gasification system A to the pyrolysis gas G1 using the actual carbonization system 1, and verifying the temperature of the pyrolysis gas G1 (the mixed gas (G4), the state of flame formation, and the pyrolysis component concentration (the tar concentration) in the pyrolysis gas.

Figure 2A:
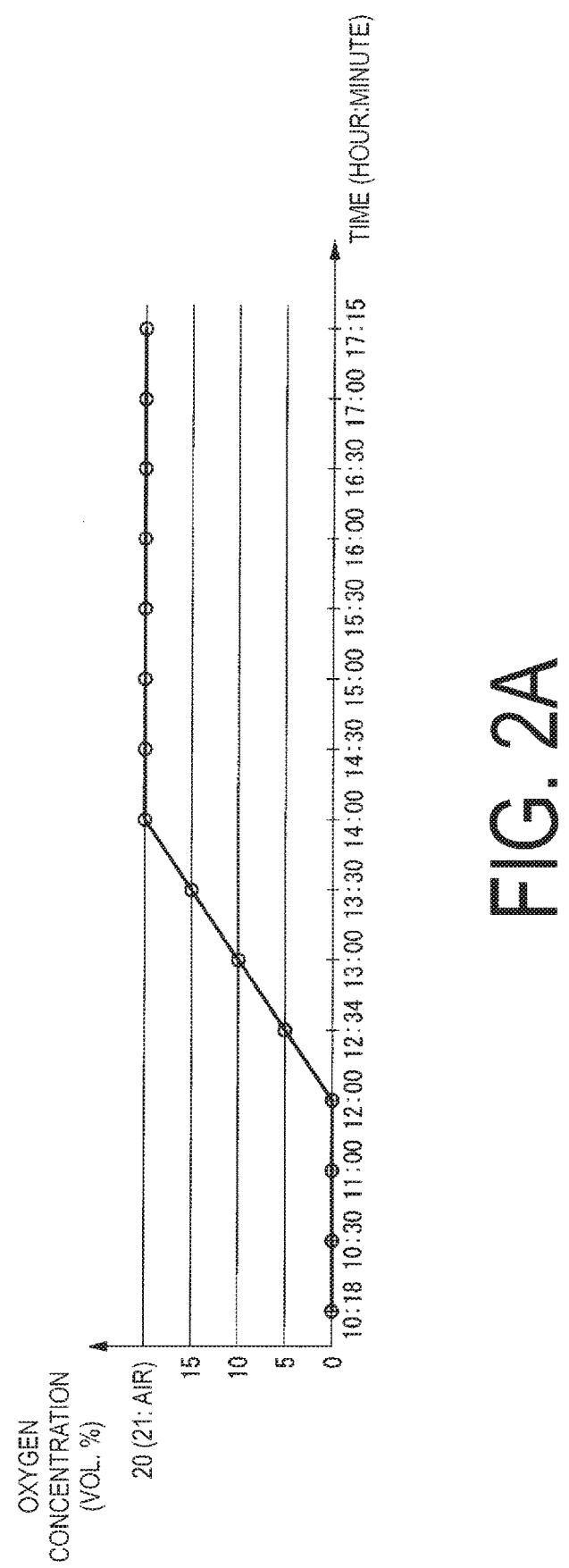
FIG. 2A is a diagram showing conditions and results of a demonstration experiment using a method for inhibiting the occurrence of a pyrolysis deposit in a pyrolysis gasification system according to an embodiment of the present invention.
Figure 2B:
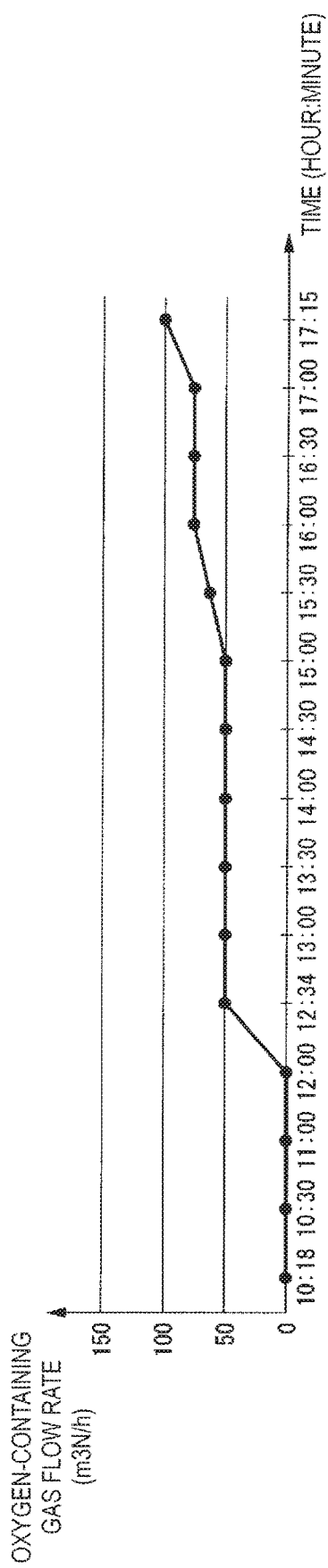
FIG. 2B is a diagram showing conditions and results of a demonstration experiment using the method for inhibiting the occurrence of a pyrolysis deposit in a pyrolysis gasification system according to an embodiment of the present invention.
Figure 2C:
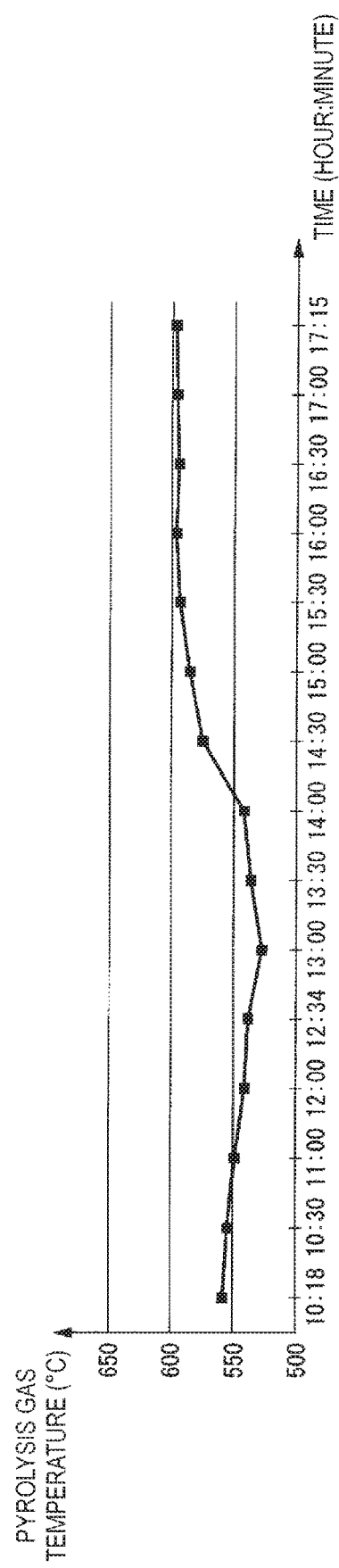
FIG. 2C is a diagram showing conditions and results of a demonstration experiment using the method for inhibiting the occurrence of a pyrolysis deposit in a pyrolysis gasification system according to an embodiment of the present invention.

In this test, as shown in FIG. 2A to FIG. 2C, the oxygen concentration of the oxygen-containing gas G3 was gradually increased to 20 volume % in increments of 5 volume % with the oxygen-containing gas G3 fed at a rate of 50 m$^3$N/h, and the change in temperature of the pyrolysis gas G1 as well as the state of flame formation were verified. Additionally, the feed rate of the oxygen-containing gas G3 having an oxygen concentration of 20% (≈21%: air) was gradually increased from 50 m$^3$N/h to 100 m$^3$N/h, and the change in temperature of the pyrolysis gas G1 was verified. Furthermore, the pyrolysis component concentrations at an outlet of the solid-gas separation unit 7 to the pyrolysis gas line 8, an inlet of the fan 10, and an inlet of the combustion furnace 6 were verified for both a case where the oxygen-containing gas G3 having an oxygen concentration of 20% was fed to a pyrolysis gas G1 at 100 m$^3$N/h, and a case where the oxygen-containing gas G3 was not fed.

As a result, as shown in FIGS. 2A to 2C, it was verified first that the temperature of the pyrolysis gas G1 gradually decreases as a result of a cooling effect of the oxygen when the oxygen-containing gas G3 is fed while gradually increasing the oxygen concentration from 0 volume % to 10 volume % in increments of 5 volume %. On the other hand, it was verified that the temperature of the pyrolysis gas G1 increases when the oxygen-containing gas G3 having an oxygen concentration of at least 15 volume % is fed while increasing the oxygen concentration from 15 volume % to 20 volume % in increments of 5 volume %, and the temperature of the pyrolysis gas G1 increases from approximately 560° C. to 600° C. when the feed rate of the 20% oxygen-containing gas G3 is gradually increased from 50 m$^3$N/h to 100 m$^3$N/h.

Additionally, the formation of flame was verified from a sight glass arranged on the oxygen-containing gas feeding means (oxygen-containing gas supply nozzle) 11 when the oxygen-containing gas G3 having an oxygen concentration of at least 15 volume % was fed.

Then, as shown in Table 1, Then the oxygen-containing gas G3 was not fed, the pyrolysis component concentration was 780 g/m$^3$ at the outlet the solid-gas separation unit 7 to the pyrolysis gas line 8. In contrast, when the oxygen-containing gas G3 having an oxygen concentration of 21% was fed to the pyrolysis gas G1, it was verified and proven that the pyrolysis component concentration is 380 g/m$^3$ at the outlet of the solid-gas separation unit 7 to the pyrolysis gas line 8, and the pyrolysis components in the pyrolysis gas G1 are pyrolyzed and the pyrolysis component concentration significantly decreases by feeding the oxygen-containing gas G3 to the pyrolysis gas G1 during facility operation.

TABLE 1

|  | Pyrolysis Component Concentration in Pyrolysis Gas (Mixed Gas) (g/m$^3$; 0° C., 101.3 kPa) Solid-gas separation unit outlet |
|---|---|
| Oxygen-containing gas not fed | 780 |
| Oxygen-containing gas fed | 380 |

Accordingly, in the method for inhibiting the occurrence of a pyrolysis deposit in a pyrolysis gasification system A and the pyrolysis gasification system A of the present embodiment, when the oxygen-containing gas G3 is fed to the pyrolysis gas G1 separated from the carbide C in the solid-gas separation unit 7 while the pyrolysis gasification system A is operating, it is possible to form a high-temperature flame of about 1000 to 1400° C. by the oxygen in this oxygen-containing gas G3, and pyrolyze the pyrolysis components, such as tar, in the pyrolysis gas G1 by this flame. Accordingly, the pyrolysis component concentration in the pyrolysis gas G1 can be decreased, making it possible to inhibit the occurrence of a pyrolysis deposit in the pyrolysis gas line 8 for introducing this pyrolysis gas G1 to the combustion furnace 6.

Thus, according to the method for inhibiting the occurrence of a pyrolysis deposit and the pyrolysis gasification system A of the present embodiment, it is possible to inhibit the occurrence of a pyrolysis deposit itself during continuous operation without stopping facilities. Then, because it is thus possible to inhibit the occurrence of a pyrolysis deposit, the occurrence of, for example, blockage of the pipe 9, and an increase in the output of the fan 10 and vibration in association with deterioration in impeller balance can be prevented, making it possible to significantly decrease maintenance frequency and operate the pyrolysis gasification system A with high efficiency.

Further, in the method for inhibiting the occurrence of a pyrolysis deposit of the present embodiment, the oxygen-containing gas G3 is fed to the pyrolysis gas G1 while the pyrolysis gasification system A is operating, thereby feeding the oxygen-containing gas G3 to the pyrolysis gas G4 having a large amount of moisture and increasing the limiting oxygen concentration that causes an explosion due to the moisture in the pyrolysis gas G1. Accordingly, it is possible to favorably form a flame and pyrolyze the pyrolysis components in the pyrolysis gas G1 without the occurrence of runaway combustion or explosion, even if the oxygen-containing gas G3 having a high oxygen concentration of at least 15 volume % is fed.

Furthermore, in the method for inhibiting the occurrence of a pyrolysis deposit of the present embodiment, the oxygen-containing gas G3 is fed to the pyrolysis gas G1 so that the mixed gas G4 obtained by mixing the oxygen-containing gas G3 with the pyrolysis gas G1 has a temperature of 500 to 650° C., thereby making it possible to inhibit the occurrence of a pyrolysis deposit in the pyrolysis gas line 8 while not exceeding the heat-resistance temperature of the components of the pyrolysis gas line 8.

Further, in the method for inhibiting the occurrence of a pyrolysis deposit of the present embodiment, even if the oxygen-containing gas G3 is fed to the pyrolysis gas G1 so that the ratio (air ratio) of the actual feed rate of the oxygen-containing G3 to the logical feed rate of the oxygen-containing gas G3 required for complete combustion of the pyrolysis gas G1 is significantly low 0.1 or less, it is possible to form a flame and reliably decrease the pyrolysis component concentration of the pyrolysis gas G1.

Furthermore, in the method for inhibiting the occurrence of a pyrolysis deposit of the present embodiment, in response to the burnout and erosion that may occur in the pipe 9 when the oxygen-containing gas G3 is fed to the pipe 9 that constitutes the pyrolysis gas line 8 and the flame is formed in this pipe 9, for example, the pyrolysis components in the pyrolysis gas G1 are pyrolyzed by feeding the oxygen-containing gas G3 in the solid-gas separation unit 7, making it possible to reliably prevent the occurrence of damage to the pyrolysis gas line 8.

While the above has described an embodiment of the method for inhibiting the occurrence of a pyrolysis deposit in a pyrolysis gasification system and the pyrolysis gasification system according to the present invention, the present invention is not limited to the above-described embodiment, allowing suitable changes without deviation from the spirit and scope of the present invention.

For example, while the solid-gas separation unit 7 is integrally provided to the pyrolysis gasification furnace 5 in the present embodiment, the solid-gas separation unit 7 may be provided separately from the pyrolysis gasification furnace 5. In this case as well, the same operational advantages as those in the present embodiment can be achieved by feeding the oxygen-containing gas G3 to the pyrolysis gas G1 in the solid-gas separation unit 7 in the same manner as in the present embodiment.

Further, the oxygen-containing gas G3 may be fed to the pyrolysis gas G1 in a plurality of locations. In this case, the pyrolysis components in the pyrolysis gas G1 can be efficiently and effectively decomposed, making it possible to more reliably inhibit the occurrence of a pyrolysis deposit.

Furthermore, the oxygen-containing gases G3 having different oxygen concentrations may be prepared, and an oxygen-containing gas G3 having a low oxygen concentration and an oxygen-containing gas G3 having a high oxygen concentration of the oxygen-containing gases may be selectively fed to the pyrolysis gas G1.

Here, pyrolysis of the pyrolysis components in the pyrolysis gas G1 by a flame formed by feeding the oxygen-containing gas G3 to the pyrolysis gas G1 is pyrolysis based on partial combustion, and decomposing all pyrolysis components in the pyrolysis gas G1 completely is difficult. Hence, the possibility exists that, when the pyrolysis gas G1 (the mixed gas G4) circulates through the pyrolysis gas line 8 toward the combustion furnace 6 and decreases in temperature, the remaining pyrolysis components will precipitate, adhere to, and accumulate on the pipe 9 and the like.

In response, when the oxygen-containing gas G3 having a high oxygen concentration is suitably and selectively fed to the pyrolysis gas G1 periodically or as required, for example, it is possible to feed the remaining oxygen not consumed in the formation of the flame to the downstream side of the pyrolysis gas line 8, and decompose and remove a pyrolysis deposit adhered to and accumulated on the downstream side of the pyrolysis gas line 8 upon reaction with this remaining oxygen. That is, when the oxygen-containing gas G3 having a high oxygen concentration is suitably and selectively fed to the pyrolysis gas G1, operational advantages similar to those of offline decoking are achieved by the oxygen in this oxygen-containing gas G3, making it possible to remove the pyrolysis deposit adhered to and accumulated on the pyrolysis gas line 8 during continuous operation without stopping the facilities.

INDUSTRIAL APPLICABILITY

In the method for inhibiting the occurrence of a pyrolysis deposit in a pyrolysis gasification system and the pyrolysis gasification system described above, when the oxygen-containing gas is fed to the pyrolysis gas separated from the carbide in the solid-gas separation unit while the pyrolysis gasification system is operating, it is possible to form a high-temperature flame by the oxygen in this oxygen-containing gas, and burn and decompose pyrolysis components, such as tar, in the pyrolysis gas by this flame. Accordingly, it is possible to inhibit the occurrence of a pyrolysis deposit in the pyrolysis gas line for introducing the pyrolysis gas to the combustion furnace.

Thus, according to the method for inhibiting the occurrence of a pyrolysis deposit in a pyrolysis gasification system and the pyrolysis gasification system described above, it is possible to inhibit the occurrence of a pyrolysis deposit during continuous operation without stopping facilities. Then, because it is thus possible to inhibit the occurrence of a pyrolysis deposit, the occurrence of for example, blockage of the pipe, and an increase in fan output and vibration in association with deterioration in impeller balance can be prevented, making it possible to significantly decrease maintenance frequency and operate the pyrolysis gasification system with high efficiency.

REFERENCE SIGNS LIST

1 Carbonization system
2 Drying process facility
3 Exhaust gas treatment facility
4 Dryer
5 Pyrolysis gasification furnace
6 Combustion furnace
7 Solid-gas separation unit
8 Pyrolysis gas line
9 Pipe
10 Fan
11 Oxygen-containing gas feeding means
15 Heat exchanger
16 Exhaust gas process column
17 Chimney
A Pyrolysis gasification system (pyrolysis gasification facility)
C Carbide
G1 Pyrolysis gas
G2 Combustion exhaust gas
G3 Oxygen-containing gas
G4 Mixed gas
G5 Waste gas
G6 Waste gas
S1 Dewatered sludge (sewage sludge, biomass)
S2 Dried sludge (sewage sludge, biomass)
T1 Waste heat
T2 Waste heat

The invention claimed is:
1. A method for inhibiting occurrence of a pyrolysis deposit in a pyrolysis gasification system, the method comprising the steps of:
gasifying biomass through pyrolysis in a pyrolysis gasification furnace;

separating, in a solid-gas separation unit having a heat resistance, a pyrolysis gas and a carbide continuously formed through pyrolysis of the biomass;

feeding an oxygen-containing gas to the solid-gas separation unit during operation of the pyrolysis gasification furnace; and introducing a mixed gas from the solid-gas separation unit to a combustion furnace through a pipe which constitutes a pyrolysis gas line, wherein the mixed gas is a mixture of the pyrolysis gas and the oxygen-containing gas.

2. The method for inhibiting the occurrence of a pyrolysis deposit in a pyrolysis gasification system according to claim 1, wherein
the oxygen-containing gas is a gas having an oxygen concentration of at least 15 volume %.

3. The method for inhibiting the occurrence of a pyrolysis deposit in a pyrolysis gasification system according to claim 1, wherein
the oxygen-containing gas is fed to the pyrolysis gas so that the mixed gas has a temperature of from 500 to 650° C.

4. The method for inhibiting the occurrence of a pyrolysis deposit in a pyrolysis gasification system according to claim 2, wherein
the oxygen-containing gas is fed to the pyrolysis gas so that the mixed gas has a temperature of from 500 to 650° C.

5. The method for inhibiting the occurrence of a pyrolysis deposit in a pyrolysis gasification system according to claim 1, wherein
the oxygen-containing gas is fed to the pyrolysis gas so that a ratio of an actual feed rate of the oxygen-containing gas to a rate sufficient to provide a stoichiometric amount of oxygen for full combustion of hydrocarbons present in the pyrolysis gas is 0.1 or less.

6. The method for inhibiting the occurrence of a pyrolysis deposit in a pyrolysis gasification system according to claim 2, wherein
the oxygen-containing gas is fed to the pyrolysis gas so that a ratio of an actual feed rate of the oxygen-containing gas to a rate sufficient to provide a stoichiometric amount of oxygen for full combustion of hydrocarbons present in the pyrolysis gas is 0.1 or less.

7. The method for inhibiting the occurrence of a pyrolysis deposit in a pyrolysis gasification system according to claim 3, wherein
the oxygen-containing gas is fed to the pyrolysis gas so that a ratio of an actual feed rate of the oxygen-containing gas to a rate sufficient to provide a stoichiometric amount of oxygen for full combustion of hydrocarbons present in the pyrolysis gas is 0.1 or less.

8. The method for inhibiting the occurrence of a pyrolysis deposit in a pyrolysis gasification system according to claim 4, wherein
the oxygen-containing gas is fed to the pyrolysis gas so that a ratio of an actual feed rate of the oxygen-containing gas to a rate sufficient to provide a stoichiometric amount of oxygen for full combustion of hydrocarbons present in the pyrolysis gas is 0.1 or less.

9. The method for inhibiting the occurrence of a pyrolysis deposit in a pyrolysis gasification system according to claim 1, wherein
oxygen-containing gases having different oxygen concentrations are prepared, and an oxygen-containing gas having a low oxygen concentration and an oxygen-containing gas having a high oxygen concentration of the oxygen-containing gases are selectively fed to the pyrolysis gas.

10. The method for inhibiting the occurrence of a pyrolysis deposit in a pyrolysis gasification system according to claim 2, wherein
oxygen-containing gases having different oxygen concentrations are prepared, and an oxygen-containing gas having a low oxygen concentration and an oxygen-containing gas having a high oxygen concentration of the oxygen-containing gases are selectively fed to the pyrolysis gas.

11. The method for inhibiting the occurrence of a pyrolysis deposit in a pyrolysis gasification system according to claim 3, wherein
oxygen-containing gases having different oxygen concentrations are prepared, and an oxygen-containing gas having a low oxygen concentration and an oxygen-containing gas having a high oxygen concentration of the oxygen-containing gases are selectively fed to the pyrolysis gas.

12. A pyrolysis gasification system comprising:
a pyrolysis gasification furnace that gasifies biomass through pyrolysis;
a solid-gas separation unit that has a heat resistance and separates a pyrolysis gas and a carbide continuously formed through pyrolysis of the biomass;
a nozzle that feeds an oxygen-containing gas to the solid-gas separation unit during operation of the pyrolysis gasification furnace;
a pipe which is configured to carry a mixed gas from the solid-gas separation unit, the mixed gas being a mixture of the pyrolysis gas and the oxygen-containing gas; and
a combustion furnace which is configured to combust the mixed gas,
wherein the mixed gas is introduced into the combustion furnace via the pipe.

* * * * *